United States Patent [19]

Bessell

[11] Patent Number: 5,104,902
[45] Date of Patent: Apr. 14, 1992

[54] CONVERSION OF SYNTHESIS GAS INTO HYDROCARBONS

[75] Inventor: Sandra Bessell, Victoria, Australia

[73] Assignee: The Broken Hill Proprietary Company Limited, Melbourne, Australia

[21] Appl. No.: 439,973

[22] Filed: Nov. 21, 1989

[30] Foreign Application Priority Data

Nov. 22, 1988 [AU] Australia .................. PJ1579

[51] Int. Cl.$^5$ .............................. L01L 1/04
[52] U.S. Cl. ............................ 518/715; 518/719
[58] Field of Search ...................... 518/715, 719

[56] References Cited

U.S. PATENT DOCUMENTS 4,659,743 4/1987 Rao et al. ............. 518/715

FOREIGN PATENT DOCUMENTS 0116732 8/1984 European Pat. Off. .
0153517 9/1985 European Pat. Off. .
1604081 12/1981 United Kingdom .

OTHER PUBLICATIONS

D. Kallo et al., Eds., Catalysis on Zeolites, Chapter 7, pp. 187-201, Budapest 1988.

*Primary Examiner*—Howard T. Mars
*Attorney, Agent, or Firm*—Armstrong, Nikaido, Marmelstein, Kubovcik & Murray

[57] ABSTRACT

A catalyst for the conversion of synthesis gas into hydrocarbons suitable for use as liquid fuels comprising a Fischer-Tropsch active metal supported on an acidic crystalline zeolite, is characterised in that the average crystal size of the zeolite is less than 5 $\mu$m, preferably about 1 $\mu$m or less. A process utilizing said catalyst is also disclosed and claimed.

9 Claims, 3 Drawing Sheets

SEM OF ZSM-5 ZEOLITE R333

SEM OF ZSM-II ZEOLITE R258/8

SEM OF ZSM-5 ZEOLITE KWO19

SEM OF ZSM-5 ZEOLITE AGP8

SEM OF ZSM-5 ZEOLITE NJ79

CONVERSION OF SYNTHESIS GAS INTO HYDROCARBONS

This invention relates to improvements in the Fischer-Tropsch process for the conversion of synthesis gas into hydrocarbons suitable for use as liquid fuels.

The Fischer-Tropsch process is well known and described in various texts such as "The Fischer-Tropsch and Related Synthesis" by Storch et al. Generally this process takes place over metals such as iron, cobalt, nickel and ruthenium, which may be supported on carriers such as kieselguhr or silica, and may contain promoter materials which enhance the catalyst activity or product selectivity. The products from this process consist of a broad weight range of hydrocarbons ranging from methane to heavy waxes and consist principally of linear paraffins and olefins.

The hydrocarbon distributions of these products generally follow the Schultz-Flory distribution, which may be represented by the following equation:

$$W_n = n\alpha^{n-1}(1-\alpha)^2$$

where $W_n$ is the weight fraction of the product with a carbon number n and $\alpha$ (commonly known as the alpha value) is the probability of chain growth, and is assumed to be independent of chain length.

There is some deviation from this equation, especially at lower carbon numbers where independence of chain growth is less likely. Methane makes are generally "higher than expected", commonly by a factor of as much as 10X, and other low carbon fractions are generally "lower than expected". This is believed to be caused by methane being formed by additional mechanisms such as cracking, and greater reactivity of lower olefins (especially ethylene) towards chain growth.

As the products from the Fischer-Tropsch synthesis are predominantly straight chained in nature, the octane number of the gasoline fraction of the resulting liquid product is low. Thus in order to produce hydrocarbons suitable for use as liquid fuels, it is necessary to limit the chain length of the product to essentially the diesel range, with minimum methane production, and to produce a gasoline fraction of enhanced octane number by increasing levels of branching and/or aromatics in the product.

To achieve this result bi-functional catalyst systems have been introduced, in which the active metal component is incorporated into a zeolite. Zeolites are crystalline aluminosilicates with shape selective and acidic properties and are further described in texts such as "Zeolite Molecular Sieves" by Breck.

Thus in recent years there has been considerable interest in the use of zeolite as supports for Fischer-Tropsch catalysts, e.g.:

(i) AU 88929/82 (U.S. Department of Energy) uses a catalyst composition of cobalt, promoted with thoria, on a ZSM-5 type zeolite support to produce high octane liquid hydrocarbon products that are in the gasoline boiling range;

(ii) AU 34883/84 (Union Carbide Corp.) describes the use of catalyst compositions consisting of steam-stabilized Zeolite Y as a catalyst support for conventional Fischer-Tropsch metals such as iron or cobalt. These compositions enhanced branching and aromatization in the products, as well as the amount of product boiling in the liquid fuel range.

However, if lighter products with further branching are required, methane production becomes undesirably high when these supports are used, due to the reduced alpha values of the lighter products, and increased cracked reactions as a consequence of the acidity of the zeolites.

DESCRIPTION OF THE INVENTION

We have now found that further reductions in the heaviness of the product, accompanied by an increase in the amount of hydrocarbon branching can be obtained, without a subsequent increase in methane production, by using a catalyst consisting of a Fischer-Tropsch active metal, promoted or unpromoted, supported on zeolites of small crystal size.

The synthesis gas for conversion comprises substantial proportions of carbon monoxide and hydrogen and may also contain smaller amounts of carbon dioxide, water, methane and nitrogen. It may be obtained from carbonaceous sources such as coal, oil shale, petroleum hydrocarbons and natural gas by known processes such as partial oxidation, gasification and steam reforming.

The relative concentrations of the gaseous components depend on the source of the synthesis gas and the process by which it is obtained. Coal derived synthesis gas is characterised by relatively low hydrogen to carbon monoxide ratios (typically of the order of 0.5 mole/mole), whilst natural gas derived synthesis gas is characterised by relatively high hydrogen to carbon monoxide ratios (typically of the order of 2 or greater).

We have been particularly interested in natural gas derived synthesis gas as a means of utilising Australia's abundant natural gas reserves, however, the process of the invention is not limited to the high hydrogen content synthesis gas derived from natural gas. Desirable hydrogen to carbon monoxide molar ratios of the synthesis gas for conversion would be in the range of 0.2 to 6.

The catalyst consists of a Fischer-Tropsch active metal, promoted or unpromoted, supported on a zeolite of small crystal size. The Fischer-Tropsch active metal, an essential part of the catalyst composition, is present in an amount of 1 to 50 weight percent based on the total weight of the catalyst composition.

It is known to those skilled in the art that thoria and other basic oxides can be used as promoter materials in Fischer-Tropsch catalyst in order to improve catalyst activity and selectivity. These promoters can be present in an amount of from 0.01 to 25 weight percent.

In order to produce a high octane number gasoline fraction it is necessary to use an acidic support in the catalyst composition. Zeolites of reasonably high silica to alumina ratios, i.e. 10 or higher, fulfil this requirement. These zeolites are exemplified by the ZSM-5 type zeolites which include ZSM-5, ZSM-11, ZSM-12, ZSM-35, ZSM-38 and other similar materials. The ZSM-5 type zeolite should be present in the formulation in an amount of from 10 to 98 weight percent.

We have found that the crystal size of the synthesised zeolite is important in affecting the nature of the hydrocarbon product obtained from the Fischer-Tropsch synthesis. The desired crystal size of the zeolite employed in this invention is less than 5 $\mu$m preferably about 1 $\mu$m or less. When zeolites of this size are used, a lighter product with a lower n-paraffin content is obtained in comparison with similar zeolites of larger crystal size. We have unexpectedly found that this increase in lightness is not accompanied by an increase in methane production.

The Fischer-Tropsch active metal and promoter may be loaded onto the ZSM-5 zeolite support by any of the methods known to those skilled in the art. These methods include:

i. mixture of the appropriate oxides and zeolite support, ii. precipitation of the metals from solution as carbonates, followed by drying, calcining and mixing the resulting oxides with the zeolite support, iii. precipitation of the metals as carbonates on the zeolite support, followed by drying and calcination.

iv. impregnation of the zeolite support with appropriate metal carbonyl solutions and/or appropriate soluble metal salt solutions, followed by drying and calcination. Aqueous or organic solutions may be used as appropriate.

Before use in synthesis gas conversion, the catalyst of the invention is reduced or activated. As is known by those skilled in the art, hydrogen, synthesis gas or another reductant may be used for this reduction step under conditions of elevated temperature and pressures of atmospheric to the pressures used in the synthesis. Typical reduction temperatures are of the order of 250°–350° C., with a pressure of from atmospheric to 3.5 MPa typically being used.

The Fischer-Tropsch process can be performed over a wide range of temperatures, pressures and space velocities. However, there are some limitations on the temperature range used if the catalyst of this invention is to be effective. In order for the zeolite to be effective in producing branched hydrocarbons the system must be at a temperature at which oligomerisation and isomerisation reactions can occur on the zeolite. This places a lower limit of 200° C. on the reaction. As the temperature is increased cracking reactions begin to occur, and at high temperatures of 350° C. and above, so much methane is produced that the process would no longer be economically feasible. Typical pressures used in the synthesis are of the order of from 0 to 5 MPa, usually from 1 to 3.5 MPa, whilst typical space velocities are at GHSV's of the order of from 10 to 10,000 $hr^{-1}$ usually from 50 to 5000 $hr^{-1}$.

BRIEF DESCRIPTION OF THE DRAWINGS

The accompanying drawings

Figure 1A:
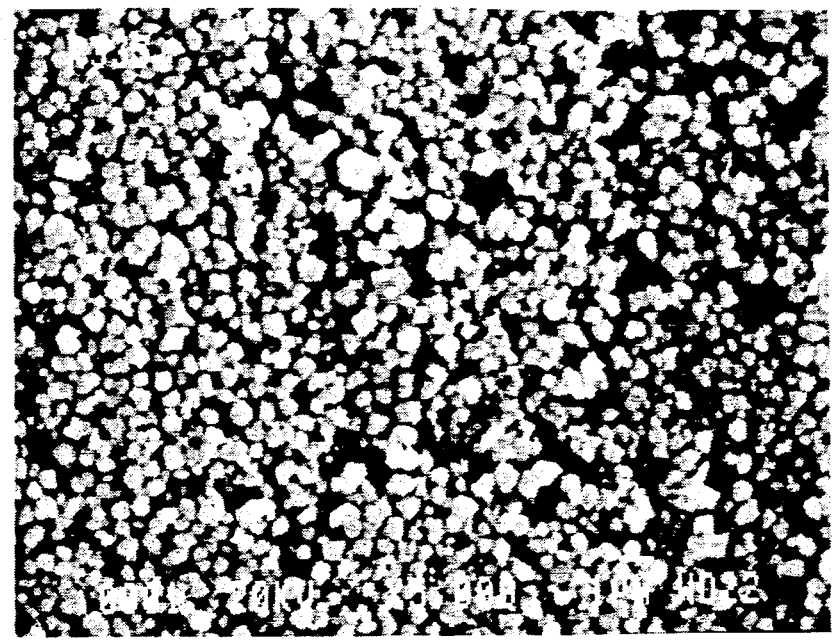
FIGS. 1(a) to (e) are scanning electron micrographs (SEM) illustrating the shape and size of crystals of five zeolites of ZSM-5 type which were selected for use as supports for the catalysts of the invention. A summary of details of these zeolites is as follows.
Figure 1B:
Figure 1C:
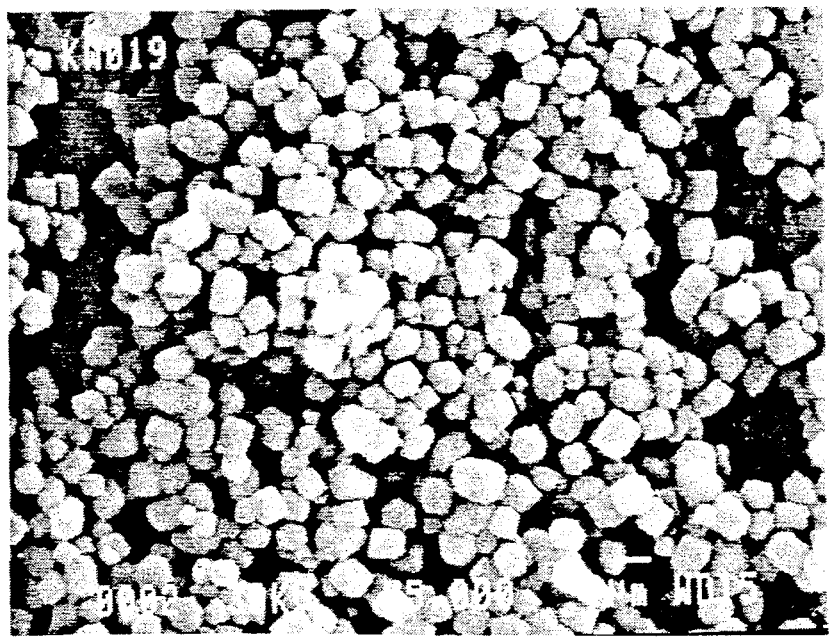
Figure 1D:
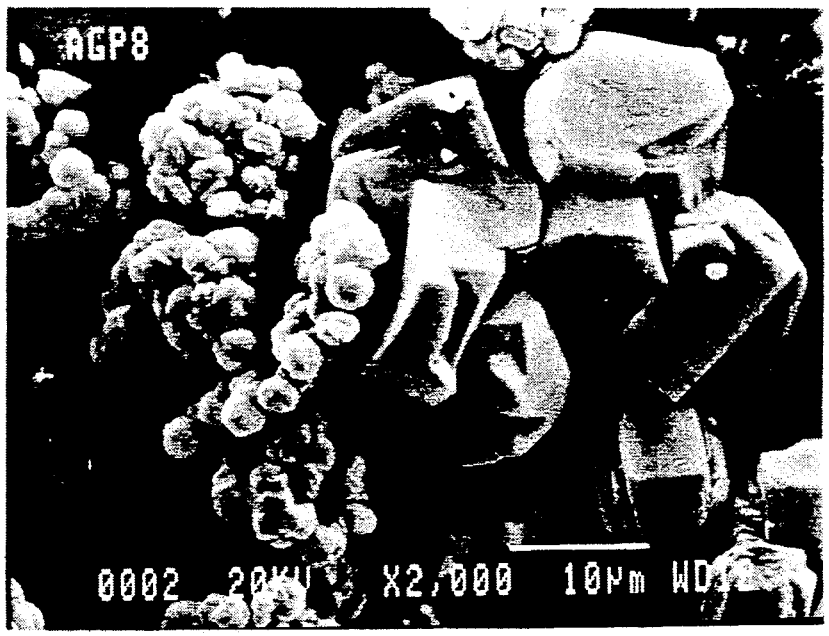
Figure 1E:
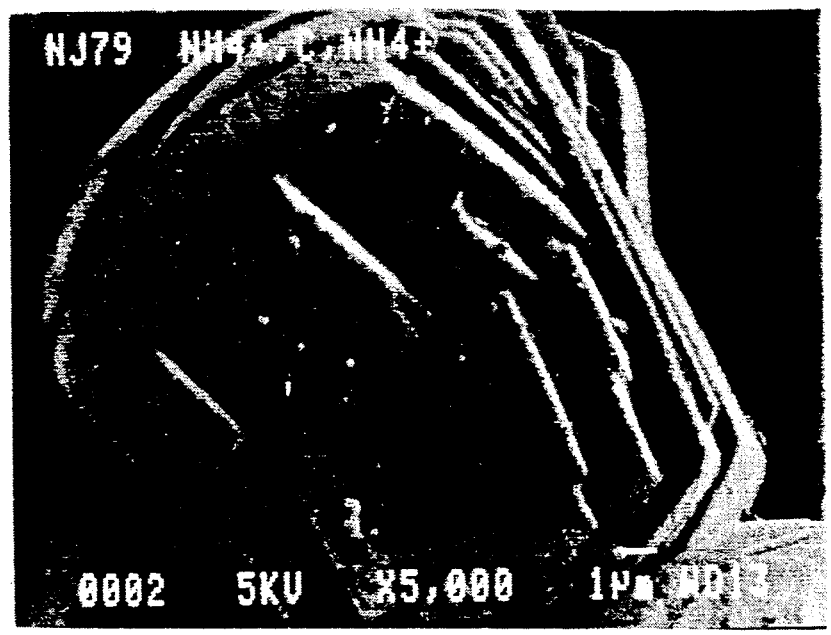

(a) R333—ZSM-5; $SiO_2/Al_2O_3=82$; spherical small crystals, average approximate diameter 0.5 $\mu m$.

(b) R258/8—ZSM-11; $SiO_2/Al_2O_3=67$; aggregates of small "rice" shaped crystals, average approximate length 1 $\mu m$, average approximate width 0.25 $\mu m$.

(c) KW019—ZSM-12; small "cube" shaped crystals, approximately 1 $\mu m$ dimension.

(d) AGP8—ZSM-5; $SiO_2/Al_2O_3=89$; mixture of small (1 $\mu m$) and large (10 $\mu m$) crystals.

(e) NJ79—ZSM-5; $SiO_2/Al_2O_3=36$; large crystal 10 $\mu m$, intergrowths and twinning evident.

EXAMPLES

The following non-limiting examples illustrate preferred embodiments of the invention. Examples 1 to 3 illustrate the preparation of small crystal zeolite supports, while Comparative Examples 4 and 5 illustrate the preparation of mixed and large crystal zeolites respectively. Methods of loading such supports with active metals are well known and were employed in Examples 6 to 10 which illustrate the production of catalysts.

EXAMPLE 1

Preparation of Zeolite R333

A solution was prepared from 180 g tetrapropylammonium hydroxide dissolved in 300 g water. This solution was added to 528 g Ludox ® (40% silica) and stirred until homogeneous. A second solution was prepared consisting of 7.5 g sodium aluminate and 30 g sodium hydroxide dissolved in 300 g water. This solution was added to the first and stirred for ten minutes.

The resulting mixture was placed in a 2 l sealed pressure vessel and maintained at 100° C. for 6 days. The resulting crystals were removed by filtration and washed.

EXAMPLE 2

Preparation of Zeolite R258/8

A solution of 86.7 g Cab-O-Sil ® silica in 1200 g water was stirred continuously whilst adding two more solutions. The first consisted of 1.09 g aluminium wire and 5.0 g sodium hydroxide in 100 g water, and the second consisted of 175 g 1,8-diaminooctane in 100 g water. 250 g sodium hydroxide was then added, followed by 30 ml of 10% hydrochloric acid.

The resulting mixture was placed in a stirred 2 l autoclave and maintained at 170° C. for 40 hours. The resulting product was then washed and filtered.

EXAMPLE 3

Preparation of Zeolite KW019

Two solutions were prepared. The first consisted of 9 ml of tetraethylammonium hydroxide solution (40% by weight) and 15 g Snowtex ® silica (a 30% colloidal silica sol), whilst the second consisted of 0.71 g of aluminium nitrate and 6 g water. The two solutions were mixed with shaking.

The resulting mixture was charged to a static autoclave, and maintained at 160° C. for 7 days. The resulting product was filtered and washed.

EXAMPLE 4

Preparation of Zeolite AGP8

A solution prepared from 75.9 g aluminium wire and 456.0 g sodium hydroxide in 33 l water was added to 20.01 kg Ludox ® (40% silica) and well stirred. 4.434 kg of tetrapropylammonium bromide, 7.5 kg of sodium chloride, as well as an extra 5 l of water, were added with stirring.

The resulting mixture was charged to a 57 l stirred autoclave and crystallised at 170° C. for 12 hours. The resulting product was filtered and washed.

EXAMPLE 5

Preparation of Zeolite NJ79

Three solutions were prepared. The first was prepared from 4.0 g aluminium wire and 17.1 g potassium hydroxide in 66.0 g water, the second from 445.0 g Ludox ® (40% silica) in 330.0 g water, and the third from 98.5 tetrapropylammonium bromide in 330.0 g water. The first solution was added to the second with stirring, then the third solution was added with stirring.

The resultant mixture was charged to a stirred 2 l autoclave and maintained at 185° C. for 16 hours. The resulting product was filtered and washed.

The zeolites of Examples 1 to 5 were examined by X-ray diffraction, and were found to display the typical X-ray patterns of ZSM-5, ZSM-11, ZSM-12, ZSM-5, and ZSM-5, respectively.

Prior to further use in catalyst preparations, the zeolites were converted to the hydrogen form. This was done by subjecting the zeolite to two treatments consisting of $NH_4^+$ exchange with a 1M ammonium nitrate solution followed by calcination at 550° C.

EXAMPLES 6 TO 11

Preparation of Catalysts

The zeolites of Examples 1 to 5 were impregnated with aqueous solutions of cobaltous nitrate so as to make a composition of approximately 100 parts by weight cobalt to 1000 parts by weight zeolite, stirred under vacuum for 30 minutes, dried in a microwave oven, and then calcined at 500° C. for approximately 4 hours. One catalyst formulation (FT261) also included a thoria promoter, added as thorium nitrate at the time of impregnation. The resulting catalysts identified by their "FT" code names were as follows:

---
6. FT255 - 100 Co: 1000 R333 (Small Crystal ZSM-5)
7. FT261 - 100 Co: 10 Th: 1000 R333 (Small Crystal ZSM-5)
8. FT198 - 100 Co: 1000 R258/8 (Small Crystal ZSM-11)
9. FT218 - 100 Co: 1000 KW019 (Small Crystal ZSM-12)
10. FT205 - 100 Co: 1000 AGP8 (Mixed Crystal ZSM-5)
11. FT202 - 100 Co: 1000 NJ79 (Large Crystal ZSM-5)
---

The catalysts were then pressed, ground, and sieved, and size fractions between 1 mm–2 mm were charged to a microreactor for testing. Prior to use, the catalysts were reduced in a stream of hydrogen at atmospheric pressure at 350° C. with a GHSV of 5000 hr$^{-1}$ for 16 hours.

Each catalyst was used to convert a synthesis gas with a 2:1 hydrogen to carbon monoxide molar ratio. Reaction conditions were a temperature of 240° C., a pressure of 2 MPa and a GHSV of 1000 hr$^{-1}$.

The catalysts were run under these conditions for at least four days, and Table 1 summarizes the average carbon monoxide conversion levels (averaged after 30 hours on line) and the product selectivities obtained (based on the weight of carbon in the product to the weight of carbon in the carbon monoxide converted).

The hydrocarbon products collected at the end of the experiment were analysed for their hydrocarbon distributions by gas chromatography, for olefinicity by an infrared spectroscopic technique, and for branching using gas chromatography/mass spectrometry, and the results summarized in Table 2.

This table clearly shows the change in the nature of the liquid product when small crystal zeolite supports are used. These catalysts produce lighter products, evidenced by the increase in the proportion of the gasoline fractions, at the expensive of higher boiling fractions, in the products. Alpha values also appear to have been lowered. These products would also be expected to yield gasoline fractions of enhanced octane number as the levels of n-paraffins and the total olefinicities have been reduced. This indicates that the levels of hydrocarbon branching have been increased.

As a consequence of the Schultz-Flory distribution, when lighter products with lower alpha values are produced, a subsequent increase in methane production would be expected. Thus, higher methane yields would be expected from the use of small crystal zeolites. The data presented in Table 1 shows that such is not the case.

TABLE 1

% CONVERSION AND PRODUCT SELECTIVITIES FOR VARIOUS COBALT/ZSM-5 TYPE FISCHER-TROPSCH CATALYSTS
(2:1 H$_2$:CO syn gas, 240° C., 2MPa, GHSV = 1000 hr$^{-1}$)

| Run Code | Catalyst | Zeolite Base | Crystal Size of Zeolite Base | % Conversion (Averaged after 30 hours on Stream) | % Selectivity (with respect to carbon) | | |
|---|---|---|---|---|---|---|---|
| | | | | | CH$_4$ | CO$_2$ | C$_2$+ |
| F08805 | FT255 | R333 | Small | 65.77 | 16 | 1 | 83 |
| F088011 | FT261 | R333* | Small | 76.91 | 16 | 1 | 83 |
| F08108 | FT198 | R258/8 | Small | 40.42 | 26 | 1 | 74 |
| F08405 | FT218 | KW019 | Small | 79.39 | 19 | 3 | 78 |
| F08106 | FT205 | AGP8 | Mixed | 66.28 | 21 | 1 | 77 |
| F08309 | FT202 | NJ79 | Large | 36.21 | 19 | 1 | 80 |

*(Thoria promoted)

TABLE 2

ANALYSES OF HYDROCARBON PRODUCTS OBTAINED FROM VARIOUS COBALT/ZSM-5 TYPE FISCHER-TROPSCH CATALYSTS
(2:1 H$_2$:CO Syn gas, 240° C., 2MPa, GHSV = 1000 hr$^{-1}$)

| Run Code | Catalyst | Zeolite Base | Crystal Size of Zeolite Base | Alpha Value | SIMULATED DISTILLATION | | | |
|---|---|---|---|---|---|---|---|---|
| | | | | | Gasoline % | Aviation Fuel % | Distillate % | Fuel Oil % |
| F08805 | FT255 | R333 | Small | 0.80 | 95.4 | 1.6 | 2.6 | 0.4 |
| F088011 | FT261* | R333 | Small | 0.74 | 94.0 | 2.0 | 3.0 | 0.7 |
| F08108 | FT198 | R258/8 | Small | 0.73 | 91.7 | 2.7 | 4.2 | 1.4 |
| F08405 | FT218 | KW019 | Small | 0.79 | 81.7 | 6.0 | 9.5 | 2.9 |
| F08106 | FT205 | AGP8 | Mixed | 0.78 | 83.4 | 4.9 | 7.9 | 3.8 |
| F08309 | FT202 | NJ79 | Large | 0.81 | 72.3 | 7.1 | 12.1 | 7.9 |

| | OLEFIN CONTENT | | | | N-ALKANE PROPORTIONS | | | |
|---|---|---|---|---|---|---|---|---|
| Run | Vinyl- | Trans- | Cl$_3$- | Total | Light | Heavy | Aviation | | Total |

TABLE 2-continued

ANALYSES OF HYDROCARBON PRODUCTS OBTAINED FROM
VARIOUS COBALT/ZSM-5 TYPE FISCHER-TROPSCH CATALYSTS
(2:1 $H_2$:CO Syn gas, 240° C., 2MPa, GHSV = 1000 $hr^{-1}$)

| Code | % | % | % | % | Gasoline | Gasoline | Fuel | Distillate | $C_5$-$C_{18}$ |
|---|---|---|---|---|---|---|---|---|---|
| F08805 | 0.1 | 2.8 | 1.6 | 4.5 | 0.23 | 0.16 | 0.20 | 0.38 | 0.23 |
| F088011 | 0.3 | 4.0 | 2.2 | 6.5 | 0.27 | 0.20 | 0.24 | 0.21 | 0.27 |
| F08108 | 0.1 | 4.4 | 2.4 | 7.0 | 0.21 | 0.15 | 0.24 | 0.45 | 0.22 |
| F08405 | 0.2 | 3.9 | 2.2 | 6.2 | 0.26 | 0.19 | 0.21 | 0.40 | 0.25 |
| F08106 | 0.3 | 3.3 | 1.8 | 5.4 | 0.43 | 0.29 | 0.35 | 0.37 | 0.38 |
| F08309 | 0.3 | 6.0 | 3.3 | 9.6 | 0.44 | 0.38 | 0.44 | 0.57 | 0.46 |

*(Thoria promoted)

An important feature of this invention is that although the product is lighter in nature, selectivities to methane have not been increased. This is further illustrated in Table 3, where the methane factors (measure of the amount of methane produced to the amount of methane predicted from the Schultz-Flory equation) are presented. These methane factors were calculated using the alpha values experimentally determined from the liquid hydrocarbon products collected. It can be seen that methane factors have been reduced by the use of small crystal zeolite supports. Thus even though higher methane selectivities would be expected from the products with lower alpha value this is not observed.

TABLE 3

METHANE FACTORS OBTAINED FROM VARIOUS
COBALT/ZSM-5 TYPE FISCHER-TROPSCH CATALYSTS
(2:1 $H_2$:O Syn gas, 240° C., 2 MPa, GHSV = 1000 $hr^{-1}$)

| RUN CODE | CATALYST | ZEOLITE BASE | CRYSTAL SIZE OF ZEOLITE BASE | METHANE FACTOR** |
|---|---|---|---|---|
| F08805 | FT255 | R333 | Small | 5.2 |
| F088011 | FT261* | R333 | Small | 3.3 |
| F08108 | FT198 | R258/8 | Small | 4.6 |
| F08405 | FT218 | KW019 | Small | 4.1 |
| F08106 | FT205 | AGP8 | Mixed | 5.9 |
| F08309 | FT202 | NJ79 | Large | 7.1 |

*(Thoria promoted)
**The methane factor is defined as the ratio of the amount of methane actually produced to the amount of methane predicted from the Schultz-Flory equation:

Methane Factor = $\dfrac{CH_4}{(1 - \alpha)^2}$ where $\alpha$ is the alpha value of the product, and $CH_4$ is the fractional selectivity to methane.

It will be clearly understood that the invention in its general aspects is not limited to the specific details referred to hereinabove.

The claims defining the invention are as follows, I claim:

1. A process for the conversion of synthesis gas comprised of hydrogen and carbon monoxide into hydrocarbons suitable for use as liquid fuels and exhibiting a high amount of hydrocarbon branching with a minimum of methane production comprising the steps of (a) supplying a Fischer-Tropsch active metal supported on an acidic crystalline zeolite, the average crystal size of the zeolite being less than 5 μm, (b) activating said catalyst, and (c) passing the synthesis gas over the activated catalyst at a temperature of from about 200° C. to 350° C.

2. A process according to claim 1 in which the molar ratio of hydrogen to carbon monoxide in the synthesis gas is in the range of 0.2 to 6.

3. A process according to claim 1, wherein step (c) is carried out a pressure from 0 to 5 MPa, and a space velocity of about 10 to 10,000 $hr^{-1}$.

4. A process according to claim 1 in which the average crystal size of the zeolite is 1 μm or less.

5. A process for the conversion of synthesis gas comprised of hydrogen and carbon monoxide into hydrocarbons suitable for use as liquid fuels exhibiting a high amount of hydrocarbon branching with a minimum of methane production, comprising the steps of (a) supplying a catalyst comprising cobalt in an amount of 1 to 50 weight percent based on the total weight of the catalyst composition, and thoria in an amount of from 0.01 to 25 weight percent, supported on an acidic crystalline zeolite of the ZSM-5 type, the average crystal size of the zeolite being less than 5 μm, (b) activating the catalyst, and (c) passing the synthesis gas over the activated catalyst at a temperature of from about 200° C. to 350° C.

6. A process according to claim 5 in which the average crystal size of the zeolite is about 1 μm.

7. A process according to any one of claims 1, 4 or 6 in which the zeolite is a ZSM-5 type zeolite.

8. A processing according to claim 1 wherein the zeolite is selected from the group consisting of ZSM-5, ZSM-11, ZSM-12, ZSM-35 and ZSM-38.

9. A process according to claim 1, wherein step (c) is carried out at a pressure of 1 to 3.5 MPa and a space velocity of about 50 to 5,000 $hr^{-1}$.

* * * * *